United States Patent
Maconachy et al.

(10) Patent No.: US 7,281,364 B2
(45) Date of Patent: Oct. 16, 2007

(54) WATER-CUTTING HARVESTING APPARATUS AND METHOD THEREFOR

(76) Inventors: Frank J. Maconachy, 507 San Vicente Cir., Salinas, CA (US) 93901; David Offerdahl, 566 Paradise Rd., Salinas, CA (US) 93907

( * ) Notice: Subject to any disclaimer, the term of this patent is extended or adjusted under 35 U.S.C. 154(b) by 0 days.

(21) Appl. No.: 10/913,762

(22) Filed: Aug. 6, 2004

(65) Prior Publication Data
US 2005/0055993 A1  Mar. 17, 2005

Related U.S. Application Data

(60) Provisional application No. 60/495,026, filed on Aug. 14, 2003.

(51) Int. Cl.
*A01D 19/00* (2006.01)
(52) U.S. Cl. .................................... 56/16.8
(58) Field of Classification Search ............ 56/16.8, 56/12.7, 8; 30/123.3; 83/177; 239/159, 239/170, 436, 443, 550, 556, 557; 53/390, 53/391
See application file for complete search history.

(56) References Cited

U.S. PATENT DOCUMENTS

| 2,670,586 | A | * | 3/1954 | Phillips | 56/158 |
|---|---|---|---|---|---|
| 2,956,386 | A | * | 10/1960 | Niemann | 56/13.8 |
| 3,706,186 | A | * | 12/1972 | Hurlburt et al. | 56/15.8 |
| 3,709,436 | A | * | 1/1973 | Foster | 239/754 |
| 4,202,495 | A | * | 5/1980 | Kranzle | 239/1 |
| 5,456,412 | A | * | 10/1995 | Agee | 239/104 |
| 5,689,944 | A | * | 11/1997 | Mirosevic | 56/16.8 |
| 6,256,886 | B1 | * | 7/2001 | Legrand | 30/123.3 |
| 6,481,193 | B2 | * | 11/2002 | Williams | 56/16.8 |

FOREIGN PATENT DOCUMENTS

DE 20011083 U1 * 10/2000

* cited by examiner

*Primary Examiner*—Thomas B. Will
*Assistant Examiner*—Alicia Torres
(74) *Attorney, Agent, or Firm*—Jeffrey Weiss; Weiss & Moy, P.C.

(57) ABSTRACT

A mobile harvesting apparatus and method utilizes a stream of liquid, propelled under high pressure through at least one nozzle, to harvest produce. Preferably, a plurality of nozzles is provided. Additionally, it is preferred that, for each nozzle provided, there is an associated diverter plate. With this configuration, a stream of liquid exiting a nozzle will, after harvesting an item of produce, strike its associated diverter plate.

1 Claim, 2 Drawing Sheets

US 7,281,364 B2

WATER-CUTTING HARVESTING APPARATUS AND METHOD THEREFOR

RELATED APPLICATION

This non-provisional application claims priority from provisional application No. 60/495,026, filed on Aug. 14, 2003.

FIELD OF THE INVENTION

The present invention relates generally to harvesting apparatuses and methods and, more particularly, to a harvesting apparatus and method utilizing a stream of water under pressure to harvest produce.

BACKGROUND OF THE INVENTION

The harvesting of leafy produce, such as lettuce, typically involves the use of a sharpened cutting implement of some type to cut the produce head from the remainder of the produce body. In the past, the cutting implement was typically a sharp knife. More recently, automated harvesting devices of various types have been employed, utilizing a band-saw type of cutting implement. U.S. patent application Ser. No. 10/207,779, filed Jul. 14, 2003, in the name of the applicants herein, relates to one type of harvesting apparatus and method utilizing a band-saw type of cutting implement.

There are certain limitations associated with prior art apparatuses and methods. The utilization of a sharpened cutting implement can be hazardous to workers operating in the vicinity thereof, and harvesting accidents do occur. Additionally, in the event the blade rusts or is otherwise not kept sufficiently clean, there is a risk of contamination of the harvested produce, and indeed the spreading of contamination from one plant to another. Still further, the use of a blade as a harvesting tool tends to "milk" the harvested produce, reducing shelf-life.

A need therefore exists for a harvesting apparatus and method that, among other things, eliminates the need for a sharpened cutting implement, including the risks of accident and contamination associated therewith, and that reduces "milking." The present invention addresses this need and provides other, related, advantages.

SUMMARY OF THE INVENTION

In accordance with one embodiment of the present invention, a harvesting apparatus is disclosed. The harvesting apparatus comprises, in combination: at least one nozzle positioned on the harvesting apparatus at a height that is appropriate for the harvesting of produce; a source of liquid; and means for propelling the liquid through the nozzle under high pressure in a direction of an item of produce so that the liquid may harvest the item of produce.

In accordance with another embodiment of the present invention, a harvesting apparatus is disclosed. The harvesting apparatus comprises, in combination: a plurality of nozzles positioned on the harvesting apparatus at a height that is appropriate for the harvesting of produce; a source of liquid; means for propelling the liquid through the plurality of nozzles under high pressure in a direction of an item of produce so that the liquid may harvest the item of produce; and a plurality of diverter plates, each of which is associated with at least one of the plurality of nozzles and positioned on the mobile harvesting apparatus so that the liquid, after exiting its associated the nozzle and cutting the item of produce, will strike the diverter plate; wherein each the diverter plate is separated from its associated the nozzle by a seed line of produce; and wherein each the diverter plate is comprised of stainless steel.

In accordance with another embodiment of the present invention a method for harvesting produce is disclosed. The method comprises the steps of: harvesting an item of produce utilizing liquid propelled under pressure through at least one nozzle; wherein the at least one nozzle is located on a mobile harvesting apparatus; and wherein the mobile harvesting apparatus travels on wheels.

DETAILED DESCRIPTION OF THE PREFERRED EMBODIMENTS

Figure 1:
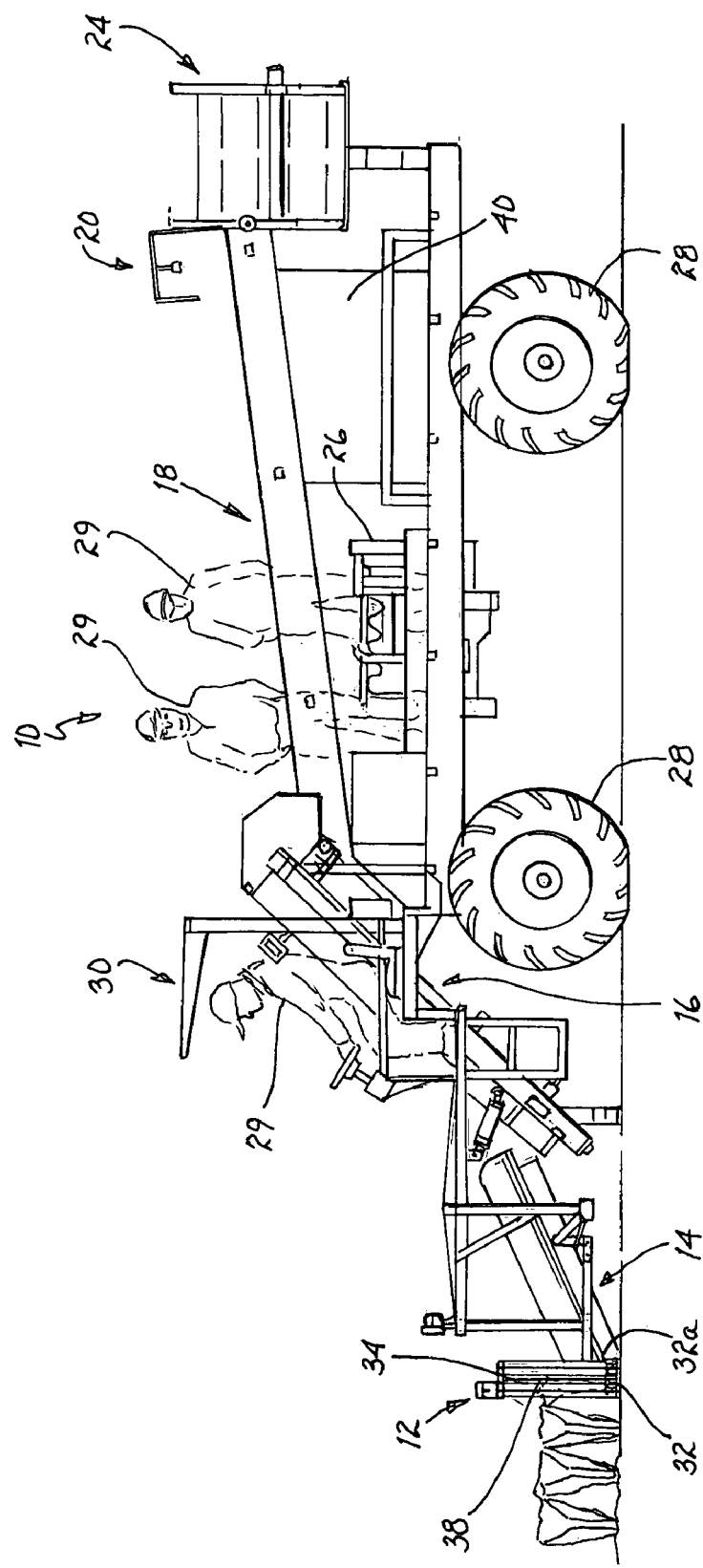
FIG. 1 is a side view of an embodiment of a lettuce harvesting apparatus, consistent with an embodiment of the present invention.

Referring first to FIG. 1, an embodiment of the lettuce harvesting apparatus 10 ("apparatus 10") of the present invention is shown. The apparatus 10 is intended to be used for the harvesting of produce. It is preferred to use the apparatus 10 to harvest celery and lettuce (including romaine lettuce), though other types of produce may also be harvested using an embodiment of the apparatus 10 of the present invention.

In one embodiment, the major components of the apparatus 10 may include a water-cutting apparatus 12 (which will be described in more detail below), a feed conveyor 14, a lift conveyor 16, an inspection conveyor 18, a washing station 20, a transfer conveyor 22, and at least one elevator conveyor 24. The apparatus 10 may be powered by an engine 26, ride on wheels 28, and may be driven by a person 29 sitting in driving compartment 30. (It should be noted that instead of being self-propelled, it would be possible to have the apparatus 10 be towable by another vehicle. In addition, instead of traveling on wheels, the apparatus 10 could be configured to travel on a track assembly.)

Figure 2:
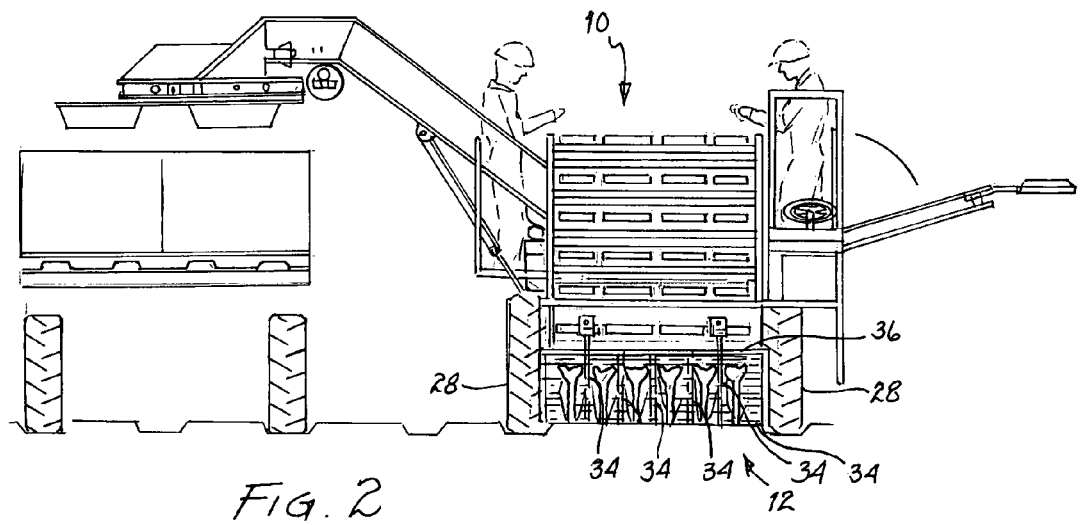
FIG. 2 is a front view of the lettuce harvesting apparatus of FIG. 1.
Figure 3:
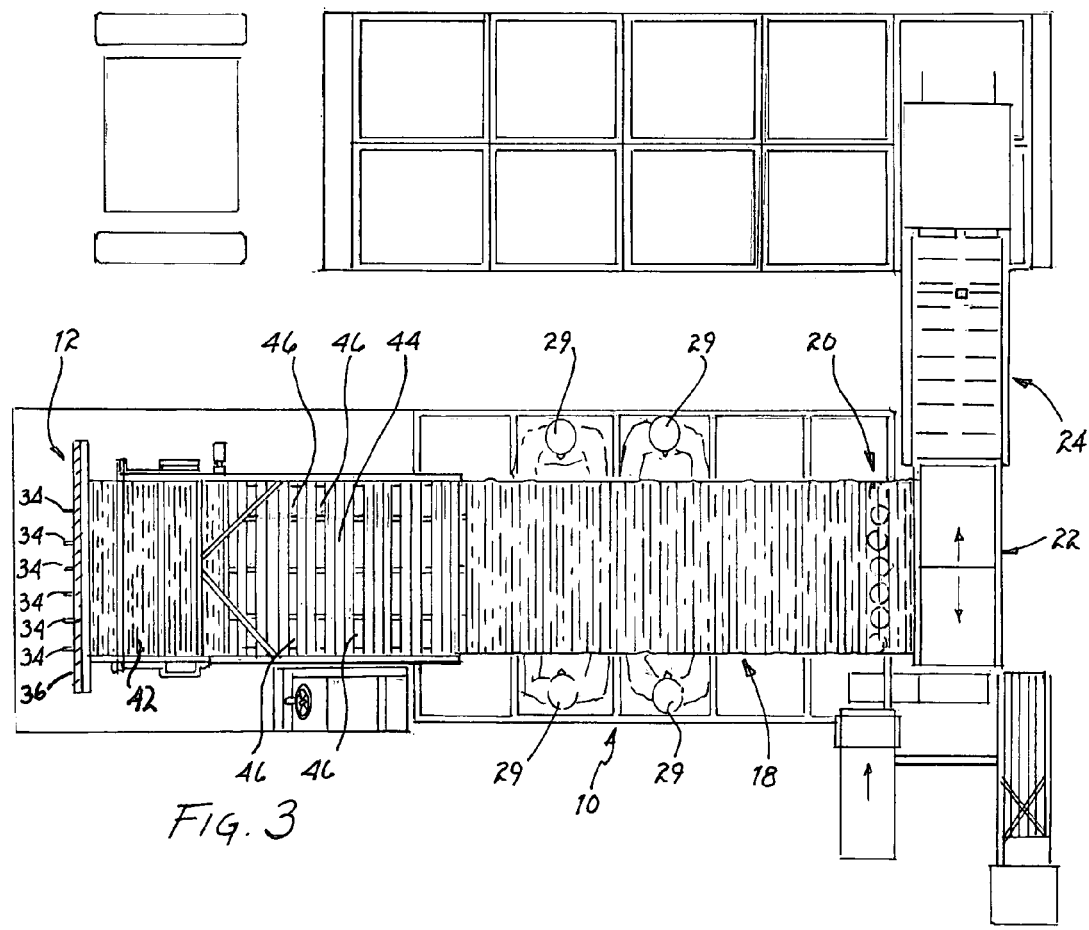
FIG. 3 is a top view of the lettuce harvesting apparatus of FIG. 1.

The water-cutting apparatus 12 may be positioned at the front of the apparatus 10 as shown in FIGS. 1-3. The water-cutting apparatus 12 may consist of at least one and preferably a plurality of water nozzles 32 positioned at the base of the feed conveyor 14. The nozzles project water under high pressure, in a direction that is substantially parallel to the level of the ground, and across the front (i.e., perpendicular to the seed line being harvested) of the feed conveyor 14. The height of the nozzles 32 should be adjustable, for example in the manner described below, so that the cutting height may be adjusted as desired.

It is preferred that there be six nozzles 32, each of which is coupled to a corresponding diverter plate 34. The diverter plates 34 should be positioned at the front of the feed conveyor 14. As best shown in FIG. 2, the spacing of the diverter plates 34 should be sufficient to permit a single seed line of the produce that is to be harvested to pass between neighboring diverter plates 34, so that produce in a single seed line is being harvested as it passes between neighboring diverter plates 34 and is exposed to the spray from a nozzle 32. The spray of the nozzles 32 is preferably aimed so that it contacts the neighboring diverter plate 34, or, particularly for the nozzle 32 on the end diverter plate 34, otherwise contacts a shielding device of some kind after passing through the produce to be harvested, so as to avoid injuring a worker passing nearby.

The diverter plates 34 are preferably comprised of stainless steel, for food safety reasons. They preferably have a height of about 24 inches, a depth (from leading edge to trailing edge) of about 10 inches, and a width of about 0.5 inches. It should be noted that deviation, including of a fairly substantial nature, would be possible from these dimensions without departing from the spirit or scope of the present invention. As shown in FIG. 1, it is preferred that the leading edge of the diverter plates 34 have a rounded anterior, inferior edge.

The diverter plates 34 are preferably coupled proximate a superior portion thereof to horizontal header bar 36. Such coupling preferably permits height adjustment of the diverter plates 34, and thus of the nozzle 32 coupled thereto. Side to side adjustment of the diverter plates 34 should also be permitted, to take into account the seed line size of the particular produce that is to be harvested. It is also preferred that the coupling of the diverter plates 34 permit the removal of at least one diverter plate 34 as necessary for a particular harvesting application. For example, where there are fewer seed lines, it may be desired to remove one or more diverter plates 34 and associated nozzle(s) 32 so that there will only be as many nozzles 32 as there are seed lines to harvest, so as to avoid the unnecessary wasting of water. Preferably, removal is facilitated by providing for rotational coupling of the diverter plates 34 to the horizontal header bar 36, so that an unneeded diverter plate 34 can be rotated upward and away from the base of the feed conveyor 14.

Water should be propelled from each nozzle 32 at a pressure and spray size sufficient to harvest the particular produce with which the apparatus 10 is being utilized. For most applications, including particularly celery, a pressure of about 25,000 pounds per square inch will be sufficient, projected from a nozzle having an orifice size of about 0.01 inches. At these specifications, water would be utilized at the rate of approximately 0.25 gallons, per minute, per nozzle. It is further preferred that the water utilized be filtered down to about one micron, so as to reduce orifice wear.

The water that is to be propelled from each nozzle is preferably fed through tubes 38 (see FIG. 1) that couple between a water tank 40 and the nozzle 32. A possible location for the water tank 40 is shown by way of example in FIG. 1, though other locations may be desired. The water tank 40 may have any desired capacity, taking into account the nature of the particular harvesting task, with a volume of about 500 gallons being considered sufficient and desirable for most applications.

It should be noted that it is preferred to provide a back-up nozzle 32a (see FIG. 1) proximate each nozzle 32. The purpose of the back-up nozzles 32a is to permit their utilization in the event of clogging, or other failure on the part of its corresponding main nozzle 32. Preferably, a valve or other switching mechanism should be interposed between the nozzle 32 and its associated back-up, so as to permit switching therebetween.

The feed conveyor 14 may, in one embodiment, be coupled to a lift conveyor 16. Such coupling may be as described in Ser. No. 10/207,779, filed Jul. 14, 2003, incorporated herein by reference. The entire feed conveyor 14 preferably maintains a generally upward angle, as indicated in FIG. 1. The belt 42 of the feed conveyor 14 travels in an upward direction, so as to move harvested produce from the front of the feed conveyor 14 upward toward the lift conveyor 16, where provided.

Turning now to the lift conveyor 16, as shown in FIGS. 1 and 2, it is preferably oriented in an upward direction, when viewed moving backward along the apparatus 10 from the feed conveyor 14. The feed conveyor 14 is preferably oriented at about a 45 degree angle. The belt 44 of the feed conveyor 14 preferably has a plurality of outwardly projecting steps 46. The purpose of the steps 46 is to prevent the produce from falling backward as it is moved upward along the lift conveyor 16.

Means for leveling the apparatus 10 are also, preferably, provided. By way of example, these may be as set forth in Ser. No. 10/207,779, filed Jul. 14, 2003, incorporated herein by reference.

When the produce reaches the topmost point of the lift conveyor 16, it will pass to the inspection conveyor 18. As the produce moves along the inspection conveyor 18, it will pass through a washing station 20.

Referring now to FIG. 1, in one embodiment, a portion of the inspection conveyor 18 may be left exposed from the top thereof, so as to permit one or preferably two persons 29 to be positioned on either side thereof. (The number of persons 29, if any, desired for the inspection conveyor 18 will depend on harvesting conditions. For particular applications, more than two persons 29 may be desired on one or both sides of the inspection conveyor 18, including for example eight persons 29 per side for some applications.) From that position, the persons 29 may inspect the produce as it passes along the inspection conveyor 18, for purposes of quality control. Alternatively, or in combination with the inspection step, one or more persons 29 could remove harvested produce (or a portion of harvested produce—e.g., the heart or the leaves) from the inspection conveyor 18 for packaging. (It should be noted that it would also be possible to position the exposed portion after the washing station 20.)

Referring now to FIGS. 2-3, it is preferred that from the end of the inspection conveyor 18, the produce may be alternatively routed via a transfer conveyor 22 to first or second elevators. Such a configuration will permit the routing of harvested produce to one of two destinations, including for example a tote bin or trailer.

Water-cutting confers a number of benefits as compared to prior art cutting methods. For example, water cutting is cleaner. Where a blade is used, the blade can rust, or can spread disease or other contamination from one plant to another. In addition, water cutting tends to cauterize the harvested produce to a greater extent than blade cutting, reducing "milking" and increasing shelf-life.

While the invention has been particularly shown and described with reference to preferred embodiments thereof, it will be understood by those skilled in the art that the foregoing and other changes in form and details may be made therein without departing from the spirit and scope of the invention.

For example, it may be possible to operate the feed conveyor 14 with the water cutting apparatus 12 as a stand-alone unit, so as to achieve the advantage of automated cutting of the produce—and then performing the washing and loading steps separately. Moreover, the feed conveyor 14 and lift conveyor 16 could be combined into a single conveyor. Still further, it would be possible to eliminate the transfer conveyor 22, and instead to configure the elevator conveyor 24 in combination with the steps 46 so that produce could pass directly from the inspection conveyor 18 to the elevator conveyor 24 without falling backward. Yet further, it would be possible to eliminate both the transfer conveyor 22 and elevator conveyor 24, with dumping of the produce taking place at the terminus of the inspection conveyor 18. Still further, the number, size, spray direction, and positioning of the nozzles 32 may be varied as desired, so long as they are able to cut produce during the harvesting process.

We claim:

1. A harvesting apparatus comprising, in combination:
  at least one nozzle positioned on said harvesting apparatus at a height that is appropriate for the harvesting of produce;
  a source of liquid;
  means for propelling said liquid through said nozzle under high pressure in a direction of an item of produce so that said liquid may harvest said item of produce;
  a feed conveyor adapted to receive produce after harvesting by said liquid being propelled from said at least one nozzle;
  a lift conveyor adapted to receive produce transported by said feed conveyor and to further transport said produce;
  an inspection conveyor adapted to receive produce transported by said lift conveyor and to further transport said produce in a manner permitting inspection thereof;
  a washing station adapted to wash said produce after said inspection thereof;
  a transfer conveyor adapted to receive washed produce and to further transport it; and
  an elevator conveyor, adapted to receive produce from said transfer conveyor and to further transport and elevate it toward an exit point.

* * * * *